US012679346B2

(12) United States Patent
Hiratsuka et al.

(10) Patent No.: US 12,679,346 B2
(45) Date of Patent: Jul. 14, 2026

(54) DRIVING ASSISTANCE DEVICE AND DRIVING ASSISTANCE METHOD

(71) Applicant: TOYOTA JIDOSHA KABUSHIKI KAISHA, Aichi-ken (JP)

(72) Inventors: Yuko Hiratsuka, Toyota (JP); Yudai Sadakuni, Toyota (JP); Kakeru Takahashi, Toyota (JP); Dai Tonuma, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 131 days.

(21) Appl. No.: 18/540,877

(22) Filed: Dec. 15, 2023

(65) Prior Publication Data

US 2024/0270239 A1     Aug. 15, 2024

(30) Foreign Application Priority Data

Feb. 15, 2023     (JP) ................................. 2023-021513

(51) Int. Cl.
  *B60W 30/09*       (2012.01)
  *B60W 50/14*       (2020.01)
  *G08G 1/16*        (2006.01)

(52) U.S. Cl.
  CPC ........... *B60W 30/09* (2013.01); *B60W 50/14* (2013.01); *G08G 1/16* (2013.01)

(58) Field of Classification Search
  CPC ................ B60W 30/09; B60W 50/14; B60W 2050/143; G08G 1/16; G08G 1/166

USPC ........................................................... 701/26
See application file for complete search history.

(56) References Cited

U.S. PATENT DOCUMENTS

| | | | |
|---|---|---|---|
| 2017/0247031 A1* | 8/2017 | Feit ....................... G01S 13/931 |
| 2020/0189518 A1 | 6/2020 | Sawai et al. | |
| 2020/0391591 A1* | 12/2020 | Kim ...................... B60W 30/08 |
| 2021/0039638 A1 | 2/2021 | Yasui | |
| 2023/0150528 A1* | 5/2023 | Seo ........................ B60K 35/10 |
| | | | 340/435 |
| 2024/0140201 A1* | 5/2024 | Fujisawa ............... B60W 50/14 |
| 2024/0239365 A1* | 7/2024 | Banerjee ................ E05F 15/40 |

FOREIGN PATENT DOCUMENTS

| | | | |
|---|---|---|---|
| JP | 2010262478 A | * | 11/2010 |
| JP | 2019073105 A | | 5/2019 |
| JP | 2020-098468 A | | 6/2020 |
| JP | 2021-026720 A | | 2/2021 |
| JP | 2022133688 A | | 9/2022 |

* cited by examiner

*Primary Examiner* — Hossam M Abd El Latif
(74) *Attorney, Agent, or Firm* — HAUPTMAN HAM, LLP

(57) ABSTRACT

The driving assistance device includes a processor configured to detect an obstacle around a vehicle based on peripheral information of the vehicle; detect a line-of-sight direction of an occupant of the vehicle; estimate a visible range of the occupant based on the line-of-sight direction and a visual field information of the occupant; notify the occupant of a warning when the obstacle is outside the visible range; and learn the visual field information of the occupant based on an execution state of a vehicle control for avoiding a collision between the vehicle and the obstacle when the obstacle is inside the visible range.

5 Claims, 5 Drawing Sheets

MISSING AREA

DRIVING ASSISTANCE DEVICE AND DRIVING ASSISTANCE METHOD

RELATED APPLICATIONS

The present application claims priority of Japanese Patent Application No. 2023-021513 filed Feb. 15, 2023, the disclosure of which is hereby incorporated by reference herein in its entirety.

BACKGROUND OF THE INVENTION

Field

The present disclosure relates to a driving assistance device and a driving assistance method.

Background

Conventionally, it is known to notify a driver of a warning when the driver of the vehicle does not recognize an obstacle around the vehicle. In the vehicle control system described in Patent Literature 1, it is described that the visual field range of the driver is calculated on the basis of the viewpoint moving speed of the driver and the gaze period of the viewpoint of the driver in order to determine whether or not a warning to the driver is necessary.

CITATIONS LIST

Patent Literature

[PTL 1] Japanese Unexamined Patent Publication No. 2010-262478
[PTL 2] Japanese Unexamined Patent Publication No. 2021-026720
[PTL 3] Japanese Unexamined Patent Publication No. 2020-098468

SUMMARY

Technical Problem

However, there are individual differences in the human visual field. It is also conceivable that the visual field of the driver is narrowed due to a visual field defect such as a visual field constriction or missing of a visual field. Therefore, in the method described in Patent Document 1, the detection accuracy of the visible range of the driver becomes low, and there is a possibility that the driver may erroneously determine that the obstacle is visible when the driver is not able to visually recognize the obstacle.

In view of the above problem, an object of the present disclosure is to provide a driver with appropriate driving assistance by accurately estimating a visible range of the driver in consideration of individual differences in the visual field.

Solution to Problem

The summary of the present disclosure is as follows.
(1) A driving assistance device comprising a processor configured to: detect an obstacle around a vehicle based on peripheral information of the vehicle; detect a line-of-sight direction of an occupant of the vehicle; estimate a visible range of the occupant based on the line-of-sight direction and a visual field information of the occupant; notify the occupant of a warning when the obstacle is outside the visible range; and learn the visual field information of the occupant based on an execution state of a vehicle control for avoiding a collision between the vehicle and the obstacle when the obstacle is inside the visible range.
(2) The driving assistance device described in above (1), wherein the processor is configured to detect a missing area of a visual field of the occupant based on the execution status of the vehicle control, and learn the visual field information so as to exclude a missing area in a specific direction from the visual field of the occupant when a frequency at which the missing area in the specific direction is detected is equal to or more than a predetermined value.
(3) The driving assistance device described in above (1), wherein the processor is configured to detect a missing area of a visual field of the occupant based on the execution status of the vehicle control, and learn the visual field information so as to exclude the missing area from the visual field of the occupant only when the occupant approves missing of the visual field.
(4) The driving assistance device described in any one of above (1) to (3), wherein the processor is configured to advance a starting timing of the vehicle control when the obstacle is outside the visible range, compared to when the obstacle is inside the visible range.
(5) A driving assistance method executed by a computer, comprising: detecting an obstacle around a vehicle based on peripheral information of the vehicle; detecting a line-of-sight direction of an occupant of the vehicle; estimating a visible range of the occupant based on the line-of-sight direction and a visual field information of the occupant; notifying the occupant of a warning when the obstacle is outside the visible range; and learning the visual field information of the occupant based on an execution state of a vehicle control for avoiding a collision between the vehicle and the obstacle when the obstacle is inside the visible range.
(6) A driving assistance device comprising: an obstacle detection unit configured to detect an obstacle around a vehicle based on peripheral information of the vehicle; a line-of-sight detection unit configured to detect a line-of-sight direction of an occupant of the vehicle; a visible range estimation unit configured to estimate a visible range of the occupant based on the line-of-sight direction and a visual field information of the occupant; a notification unit configured to notify the occupant of a warning when the obstacle is outside the visible range; and a learning unit configured to learn the visual field information of the occupant based on an execution state of a vehicle control for avoiding a collision between the vehicle and the obstacle when the obstacle is inside the visible range.

According to the present disclosure, it is possible to provide a driver with appropriate driving assistance by accurately estimating a visible range of the driver in consideration of individual differences in the visual field.

DESCRIPTION OF EMBODIMENTS

Figure 1:
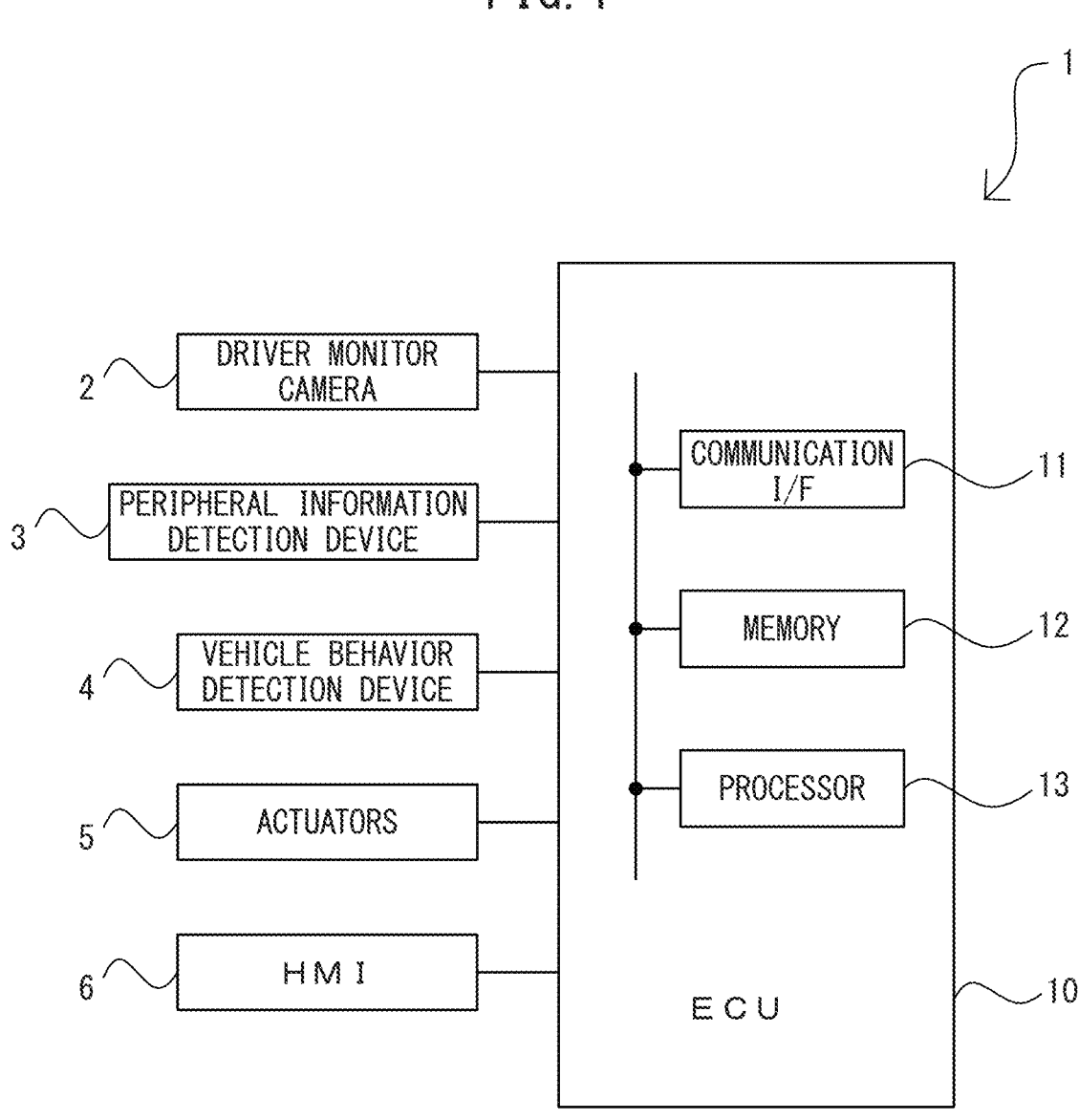
FIG. 1 is a view schematically showing a part of a configuration of a vehicle provided with a driving assistance device according to a first embodiment of the present disclosure.

Hereinafter, embodiments of the present disclosure will be described in detail with reference to the drawings. In the following description, the same reference numerals are given to the same constituent elements.

First Embodiment

Hereinafter, a first embodiment of the present disclosure will be described with reference to FIG. 1 to FIG. 4. FIG. 1 is a diagram schematically illustrating a part of a configuration of the vehicle 1 provided with the driving assistance device according to the first embodiment of the present disclosure.

As shown in FIG. 1, the vehicle 1 includes a driver monitor camera 2, a peripheral information detection device 3, a vehicle behavior detection device 4, an actuator 5, a human machine interface (HMI) 6, and an electronic control unit (ECU) 10. The driver monitor camera 2, the peripheral information detection device 3, the vehicle behavior detection device 4, the actuator 5, and the HMI 6 are electrically connected to the ECU 10 via an in-vehicle network compliant with standards such as CAN (Controller Area Network).

The driver monitor camera 2 captures a face of the driver of the vehicle 1 and generates a face image representing the face of the driver. The output of the driver monitor camera 2, that is, the facial images generated by the driver monitor camera 2 are transmitted to the ECU 10.

The peripheral information detection device 3 acquires data (images, point cloud data, and the like) around the vehicle 1 and detects surrounding information of the vehicle 1. For example, the peripheral information detection device 3 includes a camera (monocular camera or stereo camera), a millimeter-wave radar, a LIDAR (Laser Imaging Detection And Ranging), or an ultrasonic sensor (sonar), or any combination thereof. Output of the peripheral information detection device 3, that is, the peripheral information of the vehicles 1 detected by the peripheral information detection device 3 is transmitted to the ECU 10.

The vehicle behavior detecting device 4 detects the behavior of the vehicle 1. The vehicle behavior detection device 4 includes, for example, a vehicle speed sensor that detects a speed of the vehicle 1, a brake pedal stroke sensor that detects a depression force of a brake pedal provided in the vehicle 1, an accelerator position sensor that detects a depression amount (accelerator opening degree) of an accelerator pedal provided in the vehicle 1, and the like. The output of the vehicle behavior detection device 4, i.e. the behavior information of the vehicle 1 detected by the vehicle behavior detection device 4, is transmitted to the ECU 10.

The actuator 5 operates the vehicle 1. For example, the actuator 5 includes a drive device for acceleration of the vehicle 1 (for example, at least one of an internal combustion engine and an electric motor), a brake actuator for braking (decelerating) the vehicle 1, a steering actuator for steering the vehicle 1, and the like. The ECU 10 controls the actuator 5 to control the behavior of the vehicle 1.

The HMI 6 communicates information between the vehicle 1 and an occupant (for example, a driver) of the vehicle 1. The HMI 6 includes an output unit (for example, a display, a speaker, a light source, a vibrating unit, and the like) that provides information to an occupant of the vehicle 1, and an input unit (for example, a touch panel, an operation button, an operation switch, a microphone, and the like) to which information is input by the occupant of the vehicle 1. The output of the ECU 10 is notified to the occupant of the vehicle 1 via the HMI 6, and the input from the occupant of the vehicle 1 is transmitted to the ECU 10 via the HMI 6. The HMI 6 is an example of an input device, an output device, or an input/output device. Note that a mobile terminal (for example, a smart phone, a tablet terminal, or the like) of an occupant of the vehicle 1 may be connected to the ECU 10 so as to be able to communicate with each other by wire or wirelessly, and may function as the HMI 6.

The ECU 10 executes various controls of the vehicle 1. As shown in FIG. 1, the ECU 10 comprises a communication interface 11, a memory 12 and a processor 13. The communication interface 11 and the memory 12 are connected to the processor 13 via a signal line. In the present embodiment, one ECU 10 is provided, but a plurality of ECUs may be provided for each function.

The communication interface 11 has interface circuitry for connecting the ECU 10 to the in-vehicle networking. The ECU 10 is connected to other in-vehicle devices via the communication interface 11.

The memory 12 includes, for example, a volatile semiconductor memory and a non-volatile semiconductor memory. The memory 12 stores programs, data, and the like used when various kinds of processing are executed by the processor 13.

The processor 13 comprises one or more CPU (Central Processing Unit) and its peripheral circuitry. The processor 13 may further include an arithmetic circuit such as a logical operation unit, a numerical operation unit, or a graphics processing unit.

Figure 2:
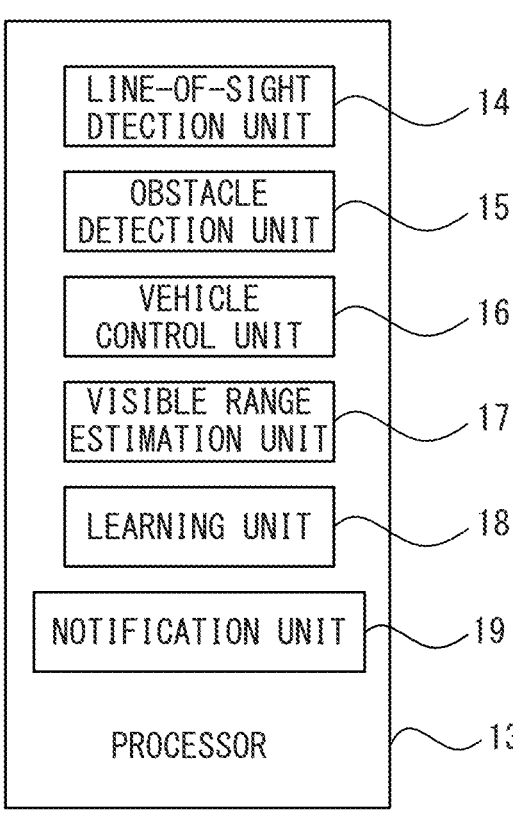
FIG. 2 is a functional block diagram of a processor of the ECU.

In the present embodiment, the ECU 10 functions as a driving assistance device that assists driving of the vehicle 1 by the driver. FIG. 2 is a functional diagram of the processor 13 of the ECU 10. The processor 13 includes a line-of-sight detection unit 14, an obstacle detection unit 15, a vehicle control unit 16, a visible range estimation unit 17, a learning unit 18, and a notification unit 19. These are functional modules realized by the processor 13 of the ECU 10 executing a computer program stored in the memory 12 of the ECU 10. These functional modules may be realized by dedicated arithmetic circuits provided in the processor 13.

The line-of-sight detection unit 14 detects the line-of-sight direction of the driver of the vehicle 1. The line-of-sight direction of the driver is calculated, for example, as 0 degrees when the driver is facing the front of the vehicle 1, as a positive value when the driver is facing the right side of the front of the vehicle 1, and as a negative value when the driver is facing the left side of the front of the vehicle 1.

For example, the line-of-sight detection unit 14 detects the line-of-sight direction of the driver by the following method. First, the line-of-sight detection unit 14 identifies a face region from the face image generated by the driver monitor camera 2, and detects the face component by extracting feature points of the face component such as the eye, the nose, the mouth, and the like. Next, the line-of-sight detection unit 14 detects the position of the Purkinje image (corneal reflection image) and the position of the pupil center, and detects the line-of-sight direction of the driver based on the positional relationship between the Purkinje image and the pupil center.

Note that the line-of-sight detection unit 14 may detect the face orientation of the driver as the line-of-sight direction of the driver. In this case, for example, the line-of-sight detection unit 14 detects the face orientation of the driver by matching the face image generated by the driver monitor camera 2 with a plurality of pieces of face shape data having different face orientations of the driver. The line-of-sight detection unit 14 detects, as the angle of the face orientation of the driver, the face direction of the face shape data having the maximum coincidence rate between the two. The plurality of pieces of face shape data are pre-stored in the memory 12 of the ECU 10 or other storage device. The plurality of pieces of face shape data may be data of a general human face or may be acquired for each driver.

Further, the line-of-sight detection unit 14 may detect the line-of-sight direction of the driver by another method. For example, the line-of-sight detection unit 14 may detect the line-of-sight direction of the driver using a discriminator learned in advance so as to output the line-of-sight direction of the driver from the image data of the face image. The example of such a discriminator include a machine learning model such as a neural network, a support vector machine, a random forest, and the like.

The obstacle detection unit 15 detects an obstacle around the vehicle 1 based on the peripheral information of the vehicle 1 detected by the peripheral information detection device 3. The obstacle is, for example, a surrounding vehicle, a pedestrian, a bicycle, a falling object, or the like. For example, the obstacle detection unit 15 detects an obstacle using a discriminator learned in advance so as to output the presence or absence of an obstacle and the direction of the obstacle from the peripheral information of the vehicle 1. The Example of such a discriminator includes a machine learning model such as a neural network, a support vector machine, a random forest, and the like.

The vehicle control unit 16 executes predetermined vehicle control for avoiding a collision between the vehicle 1 and an obstacle. The predetermined vehicle control is, for example, a vehicle control executed when the driving assistance function of the pre-crash safety (PCS) is activated in the vehicle 1. In the PCS, as TTC (Time To Collision) for an obstacle is shortened, the vehicle control of the warning, the braking control, and the steering control is executed in stages.

The visible range estimation unit 17 estimates the visual recognition range of the driver of the vehicle 1. Specifically, the visual recognition range estimation unit 17 estimates the visible range of the driver based on the line-of-sight direction of the driver detected by the line-of-sight detection unit 14 and the visual field information of the driver.

The visual field information of the driver includes a value of the driver's visual field in the horizontal direction. However, there are individual differences in the human visual field. It is also conceivable that the visual field of the driver is narrowed due to a visual field defect such as a visual field constriction or missing of visual field. Therefore, if the visual field of the driver is set to a uniform value, there is a possibility that it is erroneously determined that the obstacle is visible by the driver when the driver is not able to visually recognize the obstacle. Therefore, in the present embodiment, the visual field information of the driver is learned by the learning unit 18. As a result, it is possible to accurately estimate the visible range of the driver in consideration of the visual field of each driver, and thus to provide appropriate driving assistance to the driver.

In the present embodiment, the learning unit 18 learns the visual field information of the driver based on the execution status of the vehicle control by the vehicle control unit 16. The initial value of the visual field of the driver is set to, for example, a range between −45 degrees to −20 degrees and +20 degrees to +45 degrees when the line-of-sight direction of the driver is set to 0 degrees. As a specific example, when the line-of-sight direction of the driver is +20 degrees and the value of the visual field of the driver is in a range between −40 degrees and +40 degrees, the visible range estimation unit 17 calculates the visible range of the driver as a range between −20 degrees and +60 degrees.

When the driver is visually recognizing the obstacle, basically, the vehicle control for avoiding the collision between the vehicle 1 and the obstacle is not executed. Therefore, when the vehicle control is executed for an obstacle existing inside the visible range of the driver, there is a high possibility that the driver is not able to visually recognize an obstacle within the visible range.

Therefore, the learning unit 18 learns the visual field information of the driver in response to the execution of the predetermined vehicle control with respect to the obstacle existing inside the visible range of the driver. For example, the learning unit 18 detects the missing area of the driver's visual field based on the execution status of the predetermined vehicle control, and learns the visual field information so as to exclude the missing area from the driver's visual field. The visual field information updated by the learning of the visual field information is stored, for example, in the memory 12 of the ECU 10 or in another storage device. When the visual field information of the driver is learned, the visible range estimation unit 17 estimates the visible range of the driver based on the learned visual field information.

The notification unit 19 determines whether or not the obstacle detected by the obstacle detection unit 15 exists outside the visible range estimated by the visible range estimation unit 17. When the obstacle exists inside the visible range, it is considered that the driver recognizes the obstacle, and when the obstacle exists outside the visible range, it is considered that the driver does not recognize the obstacle. Therefore, the notification unit 19 notifies the driver of the warning when the obstacle exists outside the visible range. This makes it easy for the driver to recognize an obstacle, and it is possible to assist the driver to drive the vehicle 1. Further, in the present embodiment, since the visible range of the driver is estimated based on the learned visual field information, it is possible to notify the driver of an effective warning corresponding to the visual field characteristics of the driver.

Figure 3:
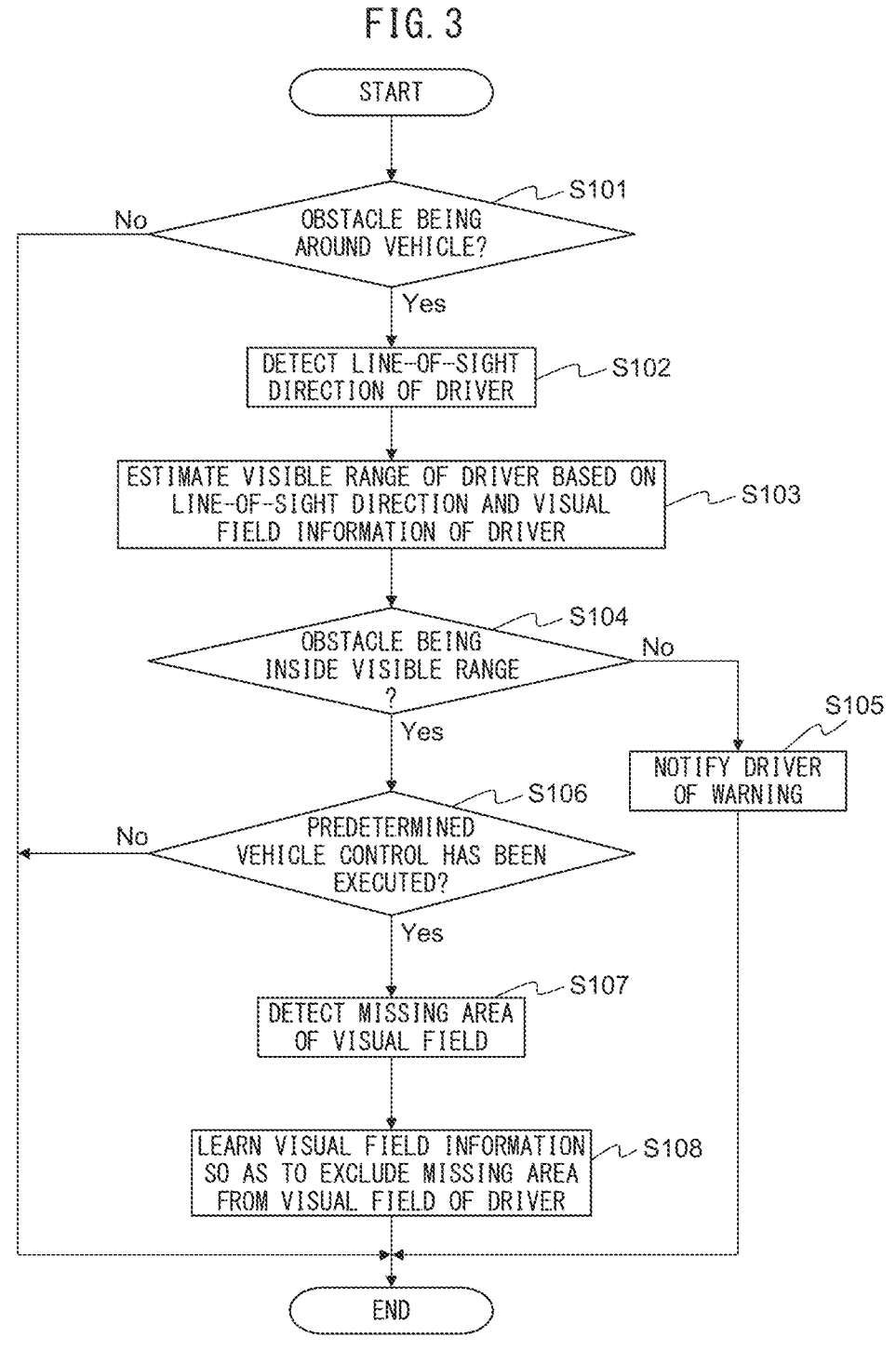
FIG. 3 is a flow chart illustrating a control routine executed by a processor of the ECU in a first embodiment.

Hereinafter, the above-described control process flow will be described by referring to FIG. 3. FIG. 3 is a flow chart showing a control routine executed by the processor 13 of the ECU 10 in the first embodiment. This control routine is repeatedly executed at predetermined execution intervals.

First, in the step S101, the obstacle detection unit 15 of the processor 13 determines whether or not an obstacle exists around the vehicle 1. If it is determined that there is no obstacle, the present control routine ends. On the other hand, if it is determined that an obstacle is present, the present control routine proceeds to the step S102.

In the step S102, the line-of-sight detection unit 14 of the processor 13 detects the line-of-sight of the driver based on the facial image of the driver generated by the driver monitor camera 2. Next, in the step S103, the visible range estimation unit 17 estimates the visible range of the driver based on the line-of-sight direction and the visual field information of the driver.

Next, in the step S104, the notification unit 19 of the processor 13 determines whether or not the obstacle detected by the obstacle detection unit 15 is present inside the visible range of the driver estimated in the step S103. For example, the notification unit 19 makes this determination by checking the direction of the obstacle and the visible range expressed in the same coordinate system (for example, a vehicle coordinate system based on the vehicle 1).

If it is determined in the step S104 that the obstacle is outside the visible range, the present control routine proceeds to the step S105. In the step S105, the notification unit 19 notifies the driver of the vehicle 1 of the warning via the HMI 6. For example, the notification unit 19 notifies an audible alert such as a buzzer or a sound via a speaker of the HMI 6. In addition, the notification unit 19 may notify a visual alert by displaying information of an obstacle via a display of the HMI 6. In addition, the notification unit 19 may notify a tactile warning via a vibrating unit of the HMI 6 provided on a steering wheel or an accelerator pedal of the vehicle 1. After the step S105, the control routine ends.

On the other hand, if it is determined in the step S104 that the obstacle exists inside the visible area, the present control routine proceeds to the step S106. In the step S106, the learning unit 18 of the processor 13 determines whether or not a predetermined vehicle control for avoiding a collision between the vehicle 1 and an obstacle has been executed by the vehicle control unit 16 of the processor 13. The predetermined vehicle control is, for example, a vehicle control executed when the driving assistance function of PCS is activated, and is at least one of a warning, a braking control, and a steering control.

If it is determined in the step S106 that the predetermined vehicle control has not been executed, the present control routine ends. On the other hand, if it is determined in the step S106 that the predetermined vehicle control has been executed, the present control routine proceeds to the step S107.

In the step S107, the learning unit 18 detects a missing area of the visual field of the driver. Specifically, the learning unit 18 detects the existence area of the obstacle with respect to the visual field of the driver as the missing area of the visual field of the driver. Next, in the step S108, the learning unit 18 learns the visual field information of the driver so as to exclude the missing area from the visual field of the driver. As a result, in the next and subsequent control routines, the process of the step S103 is executed using the learned visual field information. After the step S108, the control routine ends.

Figure 4:
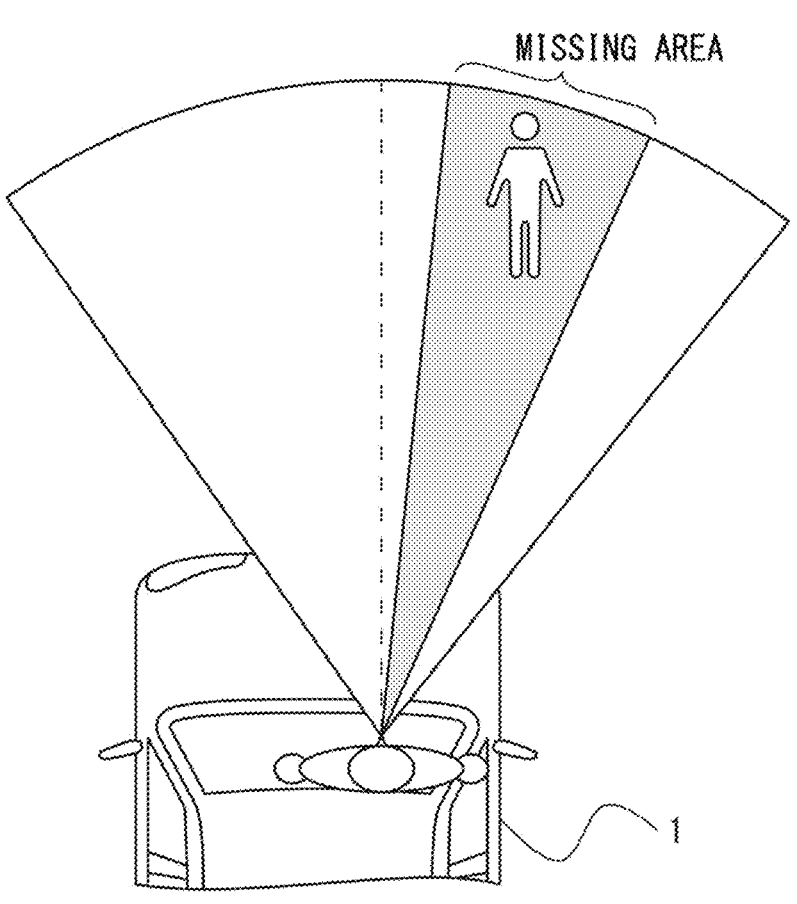
FIG. 4 is a diagram illustrating an example of a missing area of a visual field of a driver.

FIG. 4 is a diagram illustrating an example of a missing area of a visual field of a driver. In the example of FIG. 4, the driver is facing the front and the driver's line of sight is 0 degrees. Since the predetermined vehicle control was performed on the pedestrian within the visible range of the driver, the presence range of the pedestrian (in this example, a range between +5 degrees and +25 degrees) is excluded from the driver's visual field as a missing area of the driver's visual field. As a result, the visual field of the driver when the angle of the line of sight of the driver is set to 0 degrees is changed from a range between −40 degrees and +40 degrees to a range between −40 degrees and +5 degrees and a range between +25 degrees and +40 degrees.

Second Embodiment

The driving assistance device according to the second embodiment is basically the same as the configuration and control of the driving assistance device according to the first embodiment except for the points described below. Therefore, the second embodiment of the present disclosure will be mainly described below with respect to portions different from the first embodiment.

As described above, the learning unit 18 learns the visual field information of the driver in response to the execution of the predetermined vehicle control with respect to the obstacle existing inside the visible range of the driver. However, there is a possibility that the vehicle control for avoiding the obstacle was executed due to a decrease in the attention of the driver, not due to the problem of the visual field characteristics of the driver. On the other hand, when a range in a specific direction is frequently detected as a missing area of the driver's visual field, there is a high possibility that a problem arises in the visual field characteristics of the driver.

Therefore, in the second embodiment, the learning unit 18 detects the missing area of the visual field of the driver based on the execution status of the predetermined vehicle control, and learns the visual field information so as to exclude the missing area in the specific direction from the visual field of the driver when the frequency at which the missing area in the specific direction is detected is equal to or more than a predetermined value. As a result, it is possible to improve the accuracy of the learning of the visual field information and to estimate the visible range of the driver with higher accuracy.

Figure 5:
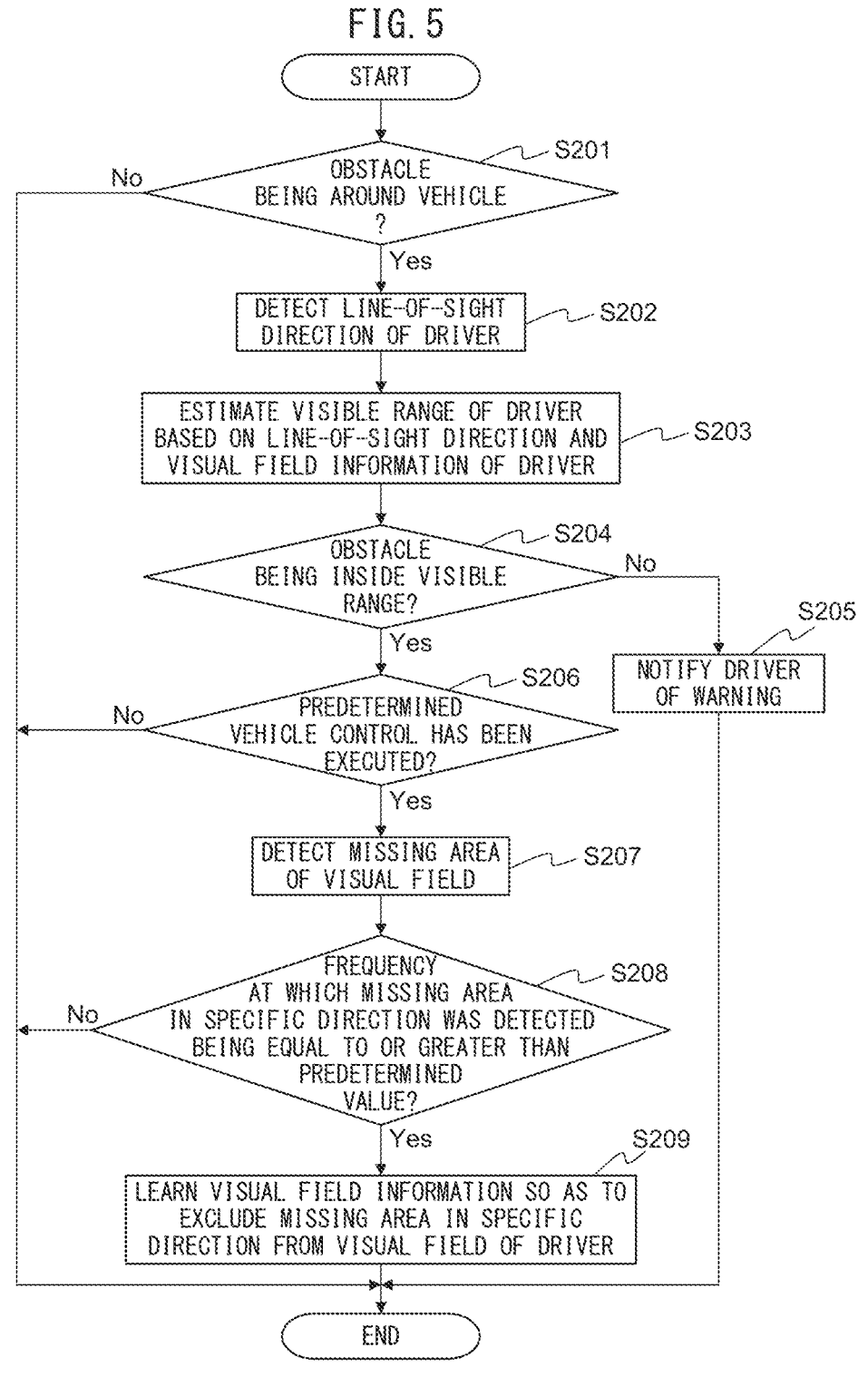
FIG. 5 is a flow chart illustrating a control routine executed by a processor of the ECU in a second embodiment.

FIG. 5 is a flow chart showing a control routine executed by the processor 13 of the ECU 10 in the second embodiment. This control routine is repeatedly executed at predetermined execution intervals.

The steps S201 to S207 are executed in the same way as the steps S101 to S107 of FIG. 3. After the step S207, in the step S208, the learning unit 18 determines whether or not the frequency at which the missing area in the specific direction is detected is equal to or greater than a predetermined value. The predetermined value is set, for example, to a frequency of two times per trip (a period from when the ignition switch of the vehicle 1 is turned on to when it is turned off).

If it is determined in the step S208 that the frequency at which the missing area in the specific direction is detected is less than the predetermined value, the present control routine ends. On the other hand, if it is determined in the step S208 that the frequency at which the missing area in the specific direction was detected is equal to or greater than the predetermined value, the present control routine proceeds to step S209.

In the step S209, the learning unit 18 learns the visual field information of the driver so as to exclude a missing area in a specific direction from the visual field of the driver. For example, when the missing area in a specific direction is a range between +10 degrees and +30 degrees, the visual field of the driver when the angle of the line of sight of the driver is 0 degrees is changed from a range between −40 degrees and +40 degrees to a range between −40 degrees and +10 degrees and a range between +30 degrees and +40 degrees. After the step S209, the control routine ends.

In addition, there is a high possibility that the driver grasps his/her visual field characteristics. Therefore, the learning unit 18 may detect the missing area of the driver's visual field based on the execution status of the predetermined vehicle control, and learn the visual field information so as to exclude the missing area from the driver's visual field only when the driver approves missing of the visual field. As a result, it is possible to improve the accuracy of the learning of the visual field information and to estimate the visible range of the driver with higher accuracy. In this instance, in the step S208, the learning unit 18 determines whether or not the driver has approved the missing of the visual field. For example, the learning unit 18 asks the driver for approval via the HMI 6, and makes this determination based on the input to the HMI 6 by the driver.

Other Embodiments

While preferred embodiments of the present disclosure have been described above, the present disclosure is not limited to these embodiments, and various modifications and changes can be made within the scope of the claims. For example, the predetermined vehicle control executed by the vehicle control unit 16 in order to avoid a collision between the vehicle 1 and an obstacle may be an acceleration suppression control or the like at the time of starting the vehicle 1 or at the time of traveling at a low speed.

In addition, when the obstacle exists outside the visible range of the driver, the vehicle control unit 16 may make the start timing of the predetermined vehicle control for avoiding the collision between the vehicle 1 and the obstacle earlier than when the obstacle exists inside the visible range. As a result, it is possible to further enhance safety against an obstacle that is highly likely not to be visually recognized by the driver. In this case, for example, the vehicle control unit 16 makes the start timing of the vehicle control in PCS faster by increasing the collision margin time with respect to the obstacle when the notification of the warning is started in PCS.

Further, in response to the execution of the predetermined vehicle control on the obstacle existing inside the visible range of the driver, the learning unit 18 may learn the visual field information so as to narrow the visual field outside the driver. As a specific example in this case, the learning unit 18 changes the range of the visual field of the driver from a range between −40 degrees and +40 degrees to a range between −35 degrees and +35 degrees.

In addition, the vehicle 1 may be a vehicle capable of performing level 1 or level 2 autonomous driving. In addition, the vehicle 1 may be a vehicle capable of performing level 3 autonomous driving in which the driver is not obliged to monitor the surroundings in a preset operational design domain (ODD). In this case, the control routine in FIG. 3 or FIG. 5 is executed when the level 3 autonomous driving is not executed in the vehicle 1. Note that the autonomous driving level in the present specification is based on the definition of SAE (Society of Automotive Engineers) J3016.

In addition, a computer program that causes a computer to realize the functions of the respective units included in the processor 13 of the ECU 10 may be provided in a form stored in a computer-readable recording medium. The computer-readable recording medium is, for example, a magnetic recording medium, an optical recording medium, or a semiconductor memory.

REFERENCE SIGNS LIST

1 Vehicle
10 Electronic control unit (ECU)
13 Processor
14 Line of sight detection unit
15 Obstacle detection unit
16 Vehicle control unit
17 Visible range estimation unit
18 Learning unit
19 Notification unit

The invention claimed is:

1. A driving assistance device comprising a processor configured to:
   detect an obstacle around a vehicle based on peripheral information of the vehicle;
   detect a line-of-sight direction of an occupant of the vehicle;
   estimate a visible range of the occupant based on the line-of-sight direction and a visual field information of the occupant;
   notify the occupant of a warning when the obstacle is outside the visible range;
   execute automated vehicle control of the vehicle, wherein the automated vehicle control comprises at least one of automated braking of the vehicle or automated steering of the vehicle;
   learn the visual field information of the occupant during execution of the automated vehicle control for avoiding a collision between the vehicle and the obstacle when the obstacle is inside the visible range; and
   detect a missing area of a visual field of the occupant during the execution of the automated vehicle control, and learn the visual field information so as to exclude a missing area in a specific direction from the visual field of the occupant when a frequency at which the missing area in the specific direction is detected is equal to or more than a predetermined value.

2. The driving assistance device according to claim 1, wherein the processor is configured to detect a missing area of a visual field of the occupant during the execution of the automated vehicle control, and learn the visual field information so as to exclude the missing area from the visual field of the occupant only in response to the occupant approving missing of the visual field.

3. The driving assistance device according to claim 1, wherein the processor is configured to initiate a starting timing of the automated vehicle control sooner when the obstacle is outside the visible range, compared to when the obstacle is inside the visible range.

4. A driving assistance method executed by a computer, comprising:
   detecting an obstacle around a vehicle based on peripheral information of the vehicle;
   detecting a line-of-sight direction of an occupant of the vehicle;
   estimating a visible range of the occupant based on the line-of-sight direction and a visual field information of the occupant;
   notifying the occupant of a warning when the obstacle is outside the visible range;
   executing automated vehicle control of the vehicle, wherein the automated vehicle control comprises at least one of automated braking of the vehicle or automated steering of the vehicle;
   learning the visual field information of the occupant during the execution of the automated vehicle control for avoiding a collision between the vehicle and the obstacle when the obstacle is inside the visible range; and
   detecting a missing area of a visual field of the occupant during the execution of the automated vehicle control, and learn the visual field information so as to exclude a missing area in a specific direction from the visual field of the occupant when a frequency at which the missing area in the specific direction is detected is equal to or more than a predetermined value.

5. A driving assistance device comprising:

a peripheral sensor configured to detect an obstacle around a vehicle based on peripheral information of the vehicle;

driver monitor camera configured to detect a line-of-sight direction of an occupant of the vehicle; and at least one processor configured to execute instructions to:

estimate a visible range of the occupant based on the line-of-sight direction and a visual field information of the occupant;

notify the occupant of a warning when the obstacle is outside the visible range;

execute automated vehicle control of the vehicle, wherein the automated vehicle control comprises at least one of automated braking of the vehicle or automated steering of the vehicle;

learn the visual field information of the occupant during the execution of the automated vehicle control for avoiding a collision between the vehicle and the obstacle when the obstacle is inside the visible range; and detect a missing area of a visual field of the occupant during the execution of the automated vehicle control, and learn the visual field information so as to exclude a missing area in a specific direction from the visual field of the occupant when a frequency at which the missing area in the specific direction is detected is equal to or more than a predetermined value.

* * * * *